Figure 1:
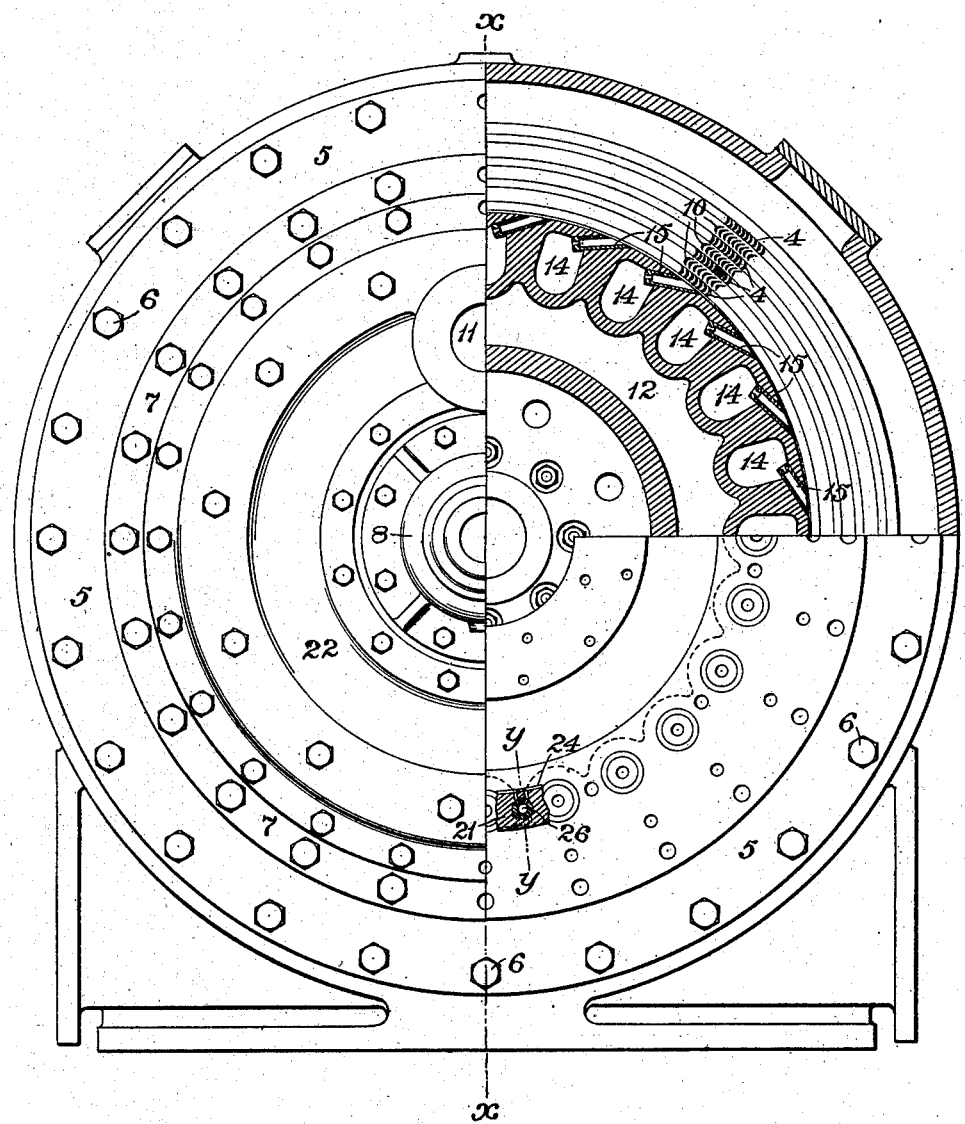

No. 712,626. Patented Nov. 4, 1902.
G. WESTINGHOUSE.
ROTARY ENGINE.
(Application filed Nov. 12, 1897.)
(No Model.) 2 Sheets—Sheet I.

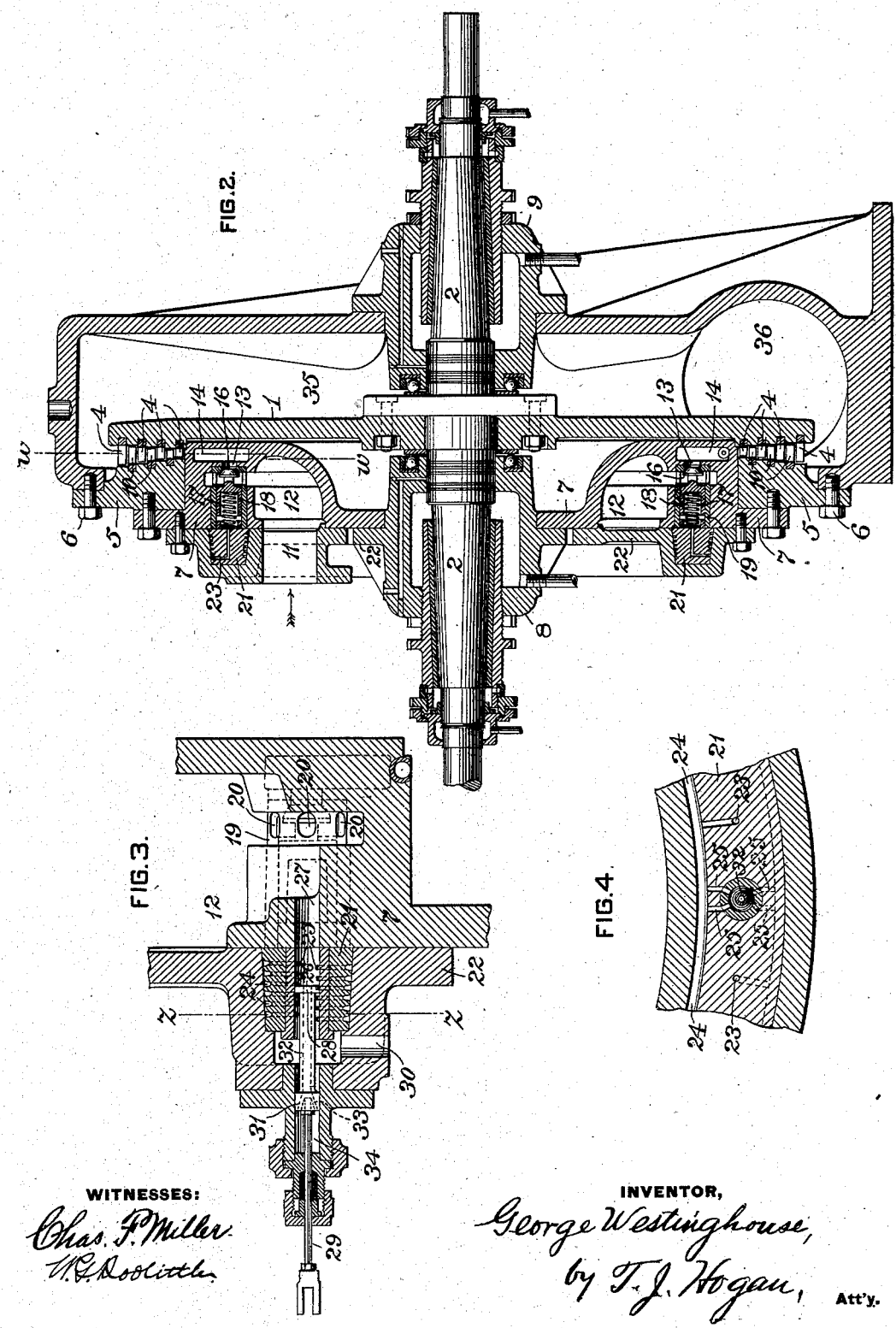

UNITED STATES PATENT OFFICE.

GEORGE WESTINGHOUSE, OF PITTSBURG, PENNSYLVANIA.

ROTARY ENGINE.

SPECIFICATION forming part of Letters Patent No. 712,626, dated November 4, 1902.

Application filed November 12, 1897. Serial No. 658,264. (No model.)

*To all whom it may concern:*

Be it known that I, GEORGE WESTINGHOUSE, a citizen of the United States, residing at Pittsburg, in the county of Allegheny and State of Pennsylvania, have invented or discovered a certain new and useful Improvement in Rotary Engines, of which improvement the following is a specification.

The object of my invention is to provide an improvement in rotary engines; and to this end my invention consists in new and useful means for increasing the efficiency of the motive fluid and for controlling and regulating the supply and distribution of the motive fluid and in certain combinations and features of construction, all as hereinafter set forth.

In the accompanying drawings, which illustrate an application of my invention, Figure 1 is a side view, partly in elevation and partly in section, of a rotary engine constructed in accordance with my invention; Fig. 2, a section on the line $x\,x$ of Fig. 1; Fig. 3, a section on the line $y\,y$ of Fig. 1 on an enlarged scale, and Fig. 4 a section of a part of the distributing-ring on the line $z\,z$ of Fig. 3.

In the embodiment of my invention as shown in the drawings a rotary disk 1 is mounted on a shaft 2 and is adapted to rotate inside of the main casing 3. The disk 1 is provided with several series of blades or vanes 4, arranged in circles concentric with the disk and against which the steam acts to cause rotation of the disk and shaft, and these blades or vanes project into the circular spaces between the several series of fixed blades or vanes 10, secured to the stationary part 5 of the engine. The part 5 may be and as shown in the drawings is annular in form, and in such case is removably secured to the fixed main casing 3 by means of the bolts 6. Secured to the part 5 is a removable head or bonnet 7, in which the supply or distribution valves 16 are mounted and in which one of the bearings 8 for the main shaft 2 is supported, the other bearing 9 being supported in and secured to the main casing 3.

In my improvement the motive fluid is adapted to act by impact on the vanes 4 to cause rotation of the disk 1 and is supplied first to the inner ring of vanes or blades on the disk 1, and after acting thereon it flows outward, alternately passing between the guide-blades on the stationary part 5 and the moving blades on the rotary disk 1, the general direction of the movement of the fluid being radial and away from the center of the disk.

Live steam is supplied to the engine through the passage 11, which opens into an annular chamber 12, and from the chamber 12 it passes through the valve-controlled ports or passages 13 into the chambers 14, from which it is discharged through the nozzles 15 against the vanes or blades.

The ports or passages 13 are controlled by the fluid-pressure-actuated valves 16, which are acted on by the pressure of the live steam in the chamber 12, tending to hold them open, and by the pressure of the springs 17, tending to close them. Each of the valves 16 is formed integral with or connected to a small piston 18, fitted in a bushing 19, on one end of which is formed a seat for the valve 16. The area of the piston 18 is somewhat greater than the area of the valve 16, and the pressure of the live steam acting on the piston 18 tends to compress the springs 17 and hold the valves 16 away from their seats.

In order to control the valves 16, I employ means for applying fluid-pressure to or releasing it from the outer ends of the piston 18, and for this purpose I provide a ring 21, which fits in a groove in the annular cover or bonnet 22, forming the outer wall of the chamber 12. The position of the ring 21 is such that it covers all of the chambers in which are fitted the pistons 18 of the valves 16, and each pair of diametrically opposite piston-chambers is connected by passages 23, formed in the ring, with one of the passages 24, which are formed in the external and internal periphery of the ring 21 and extend entirely around the ring. As shown in Fig. 3, passages 25 connect the peripheral grooves or passages 24 with the governing-valve chamber 26, to which live steam is admitted from the chamber 12 through the passages 27.

A piston-valve 28 in the chamber 27 is connected, by means of a stem 29, with any preferred form of governor mechanism adapted to move the stem 29 in accordance with variations in the speed, and the valve is adapted to be moved by the governor, so as to admit live steam through the passages 25 to the grooves 24 or to cut off those passages from the chamber 12 and to open them to the exhaust-passage 30, which is in communication with the atmosphere. As shown in Fig. 3, the passages 25, which are on the right of the piston-valve 28, are open to the chamber 12, and live steam is therefore being admitted through those passages 25 on the right of the valve to the grooves on the ring with which they are in communication, and as each of these grooves communicates with two diametrically opposite piston-chambers in the bonnet 7 by a passage similar to the passage 23 (shown in Figs. 2 and 4) live steam will be admitted to the piston-chambers connected with those grooves which are put in communication with the chamber 12 by the movement of the governing-valve 28. The live steam thus admitted to the piston-chambers acts on the pistons 18 and, together with the pressure of the springs 17, overbalances the pressure tending to hold the valves 16 open. The valves 16 will therefore be closed whenever live steam is admitted to the back of the pistons 19.

As shown in Fig. 3, the passages on the left of the piston-valve 28, which connect other grooves 24 with the valve-chamber 26, are open to the atmosphere through the passage 30, and the piston-chambers with which those passages and grooves connect are also in communication with the atmosphere, and the valves 16, connected to the pistons in those chambers, will be held open by the pressure of the live steam in the chamber 12. If the governing-valve 28 be moved to the limit of its stroke to the left, all of the grooves 24 will be filled with live steam and all of the valves 16 will be held closed, and if the valves 28 be moved far enough to the right to put all of the passages 25 in communication with the exhaust-port 30 then all of the grooves 24 will be in communication with the atmosphere, and all of the valves 16 will be open when the chamber 12 is charged with steam.

The governing-valve 28 is formed integral with or connected to a piston 31 by means of a hollow stem 32, and live steam is admitted through the hollow stem and through passages 33 in the piston to the chamber 34, in which the piston 31 is fitted. The governing-valve is thus always exposed on its opposite ends to the pressure in the chamber 12, and the valve is therefore balanced.

In starting the engine live steam is admitted through the passage 11 into the chamber 12 and acting on the inner ends of the piston 18 unseats the valves 16. The governor-valve 28 is then at its extreme position to the right, and the pistons 18 are exposed on their outer sides to atmospheric pressure through the passages 23, grooves 24, and passages 25 and 30. As the steam flows through the ports 13 into the chambers 14 and thence through the nozzles 15 and impinges on the inner row or series of vanes or blades 4 it causes rotation of the disk 1 and then flows outwardly between the members of the first row or series of stationary vanes or blades 10 to the second row or series of moving blades 4, and so on until it has passed radially outward beyond the outer row of blades into the chamber 35, from which it may be exhausted through a passage 36. The steam after acting on one series of the movable vanes flows outwardly, being deflected so as to impinge alternately on fixed and moving blades; but the general direction of the movement is radially outward, and this is an important feature when the engine is rotating at a high velocity, since the action of centrifugal force tends to increase the velocity of the fluid in a radial outward direction, and therefore does not, as in some other forms of rotary engines, tend to oppose the movement of the fluid.

In accordance with my improvement the blades in each row are all of greater length than the blades of the next inner row, so that the spaces for the passage of steam between the blades increase in lateral width—that is, in a direction at right angles to the plane of rotation—from the inner row outwardly and can be so proportioned as to provide for the increasing volume of the steam. The enlargement of the spaces is obtained, preferably, as shown in the drawings, not by forming a continuous inclined surface on the disk 1 or on the part 5 or on both of these parts, but by an abrupt offset beyond each row or series of both the fixed and movable blades, as shown in Fig. 2. By means of this construction the steam in passing outwardly from one row of blades to the other will pass into a space of greater width than that from which it comes, and as the blades in the next and wider space are longer than the blades last acted on by the steam and longer than the width of the space from which the steam comes all of the steam will be delivered against the working surface of the blades and none of it will be blown through the clearance-spaces at the free ends of the blades. It will be obvious that, so far as this feature of my improvement is concerned, it is immaterial whether the direction of the movement of the steam be radially outward or in some other direction—that is, the blades of increasing length overlapping or extending beyond the ends of the blades from which the steam comes may be employed in motors in which the blades are differently located relatively to the rotary member on which the blades are secured, and the movement of the steam may be in a direction parallel to the axis, or it may be at any angle thereto, so far as this feature is concerned.

When the velocity of the steam is very great, it may in my improved construction be discharged into and pass through the spaces in a series of the blades without any contact with or action on the non-effective surface of the disk or of the stationary part to which the guide-blades are secured. The friction of the steam on these lateral surfaces is either altogether prevented or very much reduced, and the efficiency of the steam is therefore increased. If, as in some constructions, the steam in its outward passage should completely fill the spaces between the blades and the spaces between the surface of the disk and the surface from which the guide-blades project the friction of the fluid on the surface of the disk and on the surface of the part 5 would reduce the velocity of the steam and correspondingly reduce its efficiency, and this objectionable action would be very considerable when there is any appreciable degree of moisture in the steam.

In my improvement the steam is delivered against the inner series of blades from the nozzles 15, which are so formed as to deliver the steam to the blades at a comparatively low pressure, but at a very high velocity. The employment of the nozzles and the consequent effect on the motive fluid results in the steam being delivered to the blades so as to act by impact thereon and not merely by expansion, as it would if the steam instead of being delivered by the separate nozzles were supplied to a large or continuous chamber or space having free outlet through all of the spaces between the blades of the inner row at the same time. It will be seen, therefore, that the employment of the nozzles, whereby the steam is delivered to the blades at its highest velocity, the radially-outward movement of the steam, and the abrupt widening of the spaces between the disk and the stationary part 5 and the lengthening of the blades all tend to the most efficient action of the steam by impact on the blades.

The ports 13, controlled by the valves 16, are of much greater capacity than the passages through the nozzles 15, and the opening-and-closing movement of the valves 16 will therefore not cause any wire-drawing of the steam, the pressure of the steam in the chamber 14 being the same as the pressure in the chamber 12 when the valves 16 are open.

It will be seen that with my improvement as the governor-valve 28 is moved to the right or to the left to connect the passages 25 with the atmosphere or with the chamber 12 the valves 16 will be opened or closed in pairs consecutively and that but one pair of the valves will be liable to any intermittent opening or closing on account of slight variations in the speed or load. All of the other valves will be open or closed, and therefore will not cause any wire-drawing of the steam, by which its efficiency may be affected.

While I prefer to have the valves operative in pairs as described, my improvement is not limited to this particular construction, and, if preferred, the valves may be adapted to operate singly or any number at one time, or they may be adapted to operate consecutively in the order of their arrangement or by sets or groups of any desired number.

An important feature of my invention is the means for controlling the action of the valves by the admission of the fluid to and its release from the outer sides of the pistons 18, by which the movement of any number of valves may be effected by fluid-pressure under the control of the governing-valve without other mechanism or moving parts than the valves and the governing device.

The formation of the grooves 24 and passages 23 and 25 in the removable ring 21 provides a simple, compact, and inexpensive construction by which the governing-valve may control the positions of the valves 16. The locations of the grooves and passages in the ring are such that they may all be easily and quickly formed by turning and drilling, and the interior of the passages and grooves may be made as smooth as desired, and by removing the ring the passages may be easily and quickly cleaned. These passages and grooves when formed as shown and described may be made much smaller and with greater accuracy and finish than they could be made by coring out the casting, and the size of the part 22 in which the ring 21 is fitted is very much less than would be required if the passages and grooves were formed in any other manner.

The construction as shown provides a convenient and practical way of forming the passages; but my invention is not limited to this particular construction, and, if preferred, pipes or cored passages or passages formed in any other way may be employed.

I claim as my invention and desire to secure by Letters Patent—

1. In a fluid-actuated motor, the combination with a set of symmetrically-disposed supply-valves, of independent fluid-conducting passages severally leading to certain valves of said set and a governor-valve which operates to successively open and close said passages and thereby control the operation of the supply-valves.

2. In a fluid-actuated motor, the combination with a set of supply-valves adapted to be actuated by fluid-pressure, of a set of fluid-conducting passages severally leading to one or more valves of said set, and a governor-valve which operates to control the flow of actuating fluid into and out of said passages successively.

3. In a fluid-actuated motor, the combination of a valve controlling the supply of fluid to the motor and which is adapted to be held open by the action of the motor fluid, and means for closing the valve by the action of fluid-pressure under the control of a governing-valve, substantially as set forth.

4. In a fluid-actuated motor, the combination of supply-valves controlling the supply of motive fluid, and adapted to be actuated by fluid under pressure, and a governing-valve controlling the simultaneous operation of a plurality of the supply-valves, substantially as set forth.

5. In a rotary motor, the combination with a rotary member provided with vanes, or blades, of a series of independent passages for conducting fluid into contact with the vanes, or blades, a series of fluid-actuated valves for severally controlling the supply of fluid to the passages and a governor-valve for controlling the operation of the supply-valves, substantially as set forth.

6. In a casing, frame, or cover, of an engine, the combination, with a series of chambers, of two parts adapted to form a tight joint, grooves, or channels, leading to the chambers and formed in one of the parts, and covered by the other part forming the joint, and a governing-valve controlling the admission of fluid to and its release from the grooves, substantially as set forth.

7. The combination, with a series of supply-valves operative by the action of fluid under pressure, a governing-valve for controlling the fluid under pressure, and grooves or channels formed in the surface of a removable piece through which fluid may be supplied to or released from the supply-valves by the action of the governor-valve, to control the supply-valves, substantially as set forth.

8. The combination, in a rotary engine, of a rotary member, or disk, vanes or blades secured to the rotary member, a series of supply-valves for supplying steam to the vanes, or blades, and which are adapted to be held open by fluid under pressure, pistons formed on or secured to the supply-valves, and a governor-valve controlling the admission of fluid to the pistons and its release therefrom, substantially as set forth.

9. In a rotary engine, the combination, with a series of valves controlling the supply of fluid to the vanes or blades, of the engine, pistons secured to the valves and fitted in chambers arranged in a circle about the axis of the main shaft, a ring concentric with the chambers and fitted into a cap, or bonnet, so as to form a tight joint therewith, grooves or channels in the surface of the ring forming the joint, and a governor-valve controlling the admission of fluid to and its release from the grooves or channels, substantially as set forth.

In testimony whereof I have hereunto set my hand.

GEO. WESTINGHOUSE.

Witnesses:
E. W. NEWELL,
E. GALLAGHER.